Nov. 26, 1940. R. O. JOHNSON 2,222,815
FLOWERPOT LINER AND FERTILIZER CONTAINER
Filed April 19, 1939
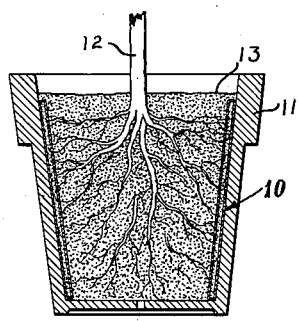
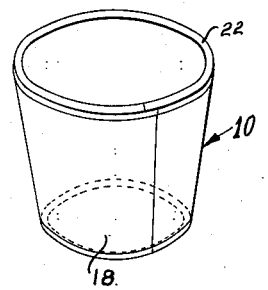
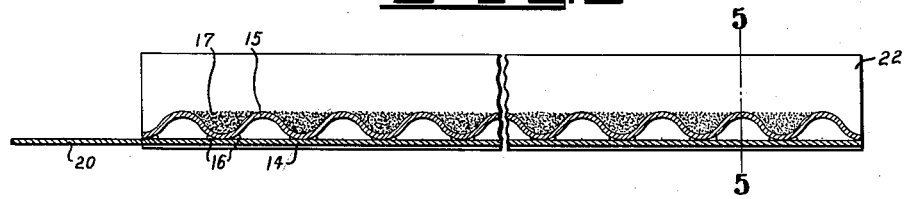
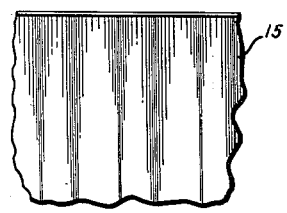
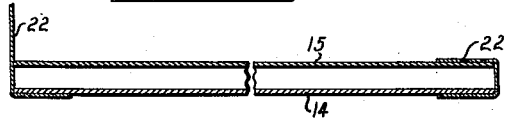
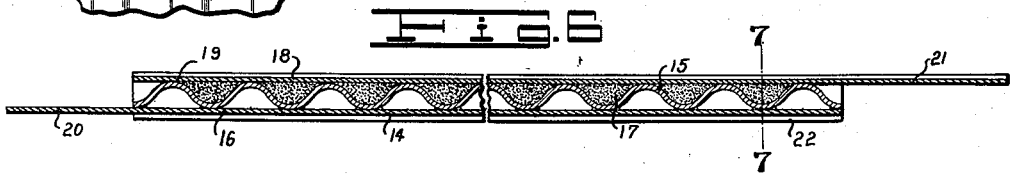
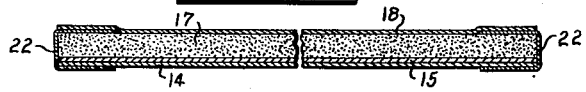
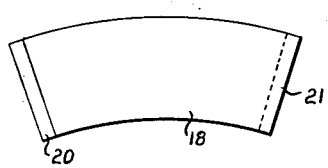
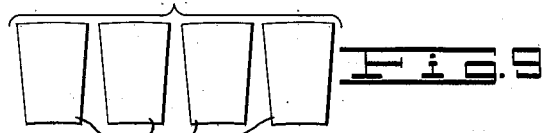
INVENTOR.
R. O. JOHNSON
BY
ATTORNEY.

Patented Nov. 26, 1940

2,222,815

UNITED STATES PATENT OFFICE 2,222,815

FLOWERPOT LINER AND FERTILIZER CONTAINER

Ragnar O. Johnson, Pasadena, Calif.

Application April 19, 1939, Serial No. 268,741

1 Claim. (Cl. 71—64)

This invention relates to water soluble fertilizer container.

The general object of the invention is to provide an improved fertilizer container which can be placed as a liner in a receptacle such as a flowerpot where it will disintegrate and allow the fertilizer to be available for the plant contained in the receptacle.

A more specific object of the invention is to provide a flowerpot liner which is made of paper and which has fertilizer arranged therein in such manner that the container will disintegrate and the fertilizer become available.

Another object of the invention is to provide a pot liner made of corrugated water soluble material with fertilizer contained in the corrugations.

An additional object of the invention is to provide a novel fertilizer containing pot lining.

Other objects and the advantages of this invention will be apparent from the following description taken in connection with the accompanying drawing, wherein:

Fig. 1 is a central sectional view of the flowerpot showing my invention applied thereto;

Fig. 2 is a perspective view showing my soluble liner;

Fig. 3 is an end view of the liner partly completed;

Fig. 4 is a fragmentary top plan view of the corrugated strip;

Fig. 5 is a section taken on line 5—5, Fig. 4;

Fig. 6 is a sectional view of the completed liner;

Fig. 7 is a section taken on line 7—7, Fig. 6;

Fig. 8 is a plan view of the liner; and

Fig. 9 is a plan view of a modification.

Referring to the drawing by reference characters I have shown my invention as embodied in a pot liner which is indicated generally at 10. When raising plants in pots it is desirable that a readily accessible fertilizer for rapid growth of the plants be provided. The fertilizer should preferably be evenly distributed so that it will be available for the plants to feed upon. Heretofore it has been customary, particularly in large establishments, to place a small handful of fertilizer in each pot at the proper times. This is a troublesome time wasting procedure and my invention seeks to overcome the difficulties and to provide a quick and reliable means for fertilizing plants.

Referring again to the drawing a pot is indicated at 11 having a plant 12 growing therein. The pot is provided with a liner 10 which is in the form of an inverted truncated hollow cone and is preferably disposed in the pot so that it lines the wall thereof and terminates at the upper end thereof at about the soil level 13 in the pot.

As shown the liner includes a backing strip 14 having a corrugated paper strip 15 thereon. The strips 14 and 15 are secured together at the troughs 16 of the corrugations.

Each of the upwardly facing grooves of the corrugations is shown as filled at 17 with fertilizer and a covering strip 18 is disposed so that it covers the outwardly facing corrugations and engages the crests at 19 where it is secured as by glueing. The backing strip is continuous at one end as at 20 and the covering strip is continuous at the other end as at 21 so that when the blank shown in Fig. 8 is folded to the position shown in Fig. 2 the flaps 20 and 21 may be secured to the body to hold the liner in proper form. If desired, the flaps 20 and 21 could be omitted although they are preferably employed as they serve to hold the liner in shape.

The ends of the corrugations are shown as closed by sealing strips 22 which are shown in Figs. 5 and 7 as secured to the backing strip 14 and the cover strip 18.

In Fig. 9 I show a modification of my invention wherein the portions 23 going to make up the pot liner are shown as four in number and are adapted to be placed in edge to edge relation in the pot.

In use the liner is inserted in the pot after which the soil is placed therein and then the plant or seed is placed in the soil. All of the paper portions of the liner are made preferably of water soluble material and may be made of either paper or of pulp board or similar material.

The fertilizer used may be of any desirable kind and may be what is known as commercial fertilizer and the particular proportions may be varied to suit the requirement of the plant with which the particular liner is to be used.

From the foregoing description it will be apparent that I have invented a novel pot liner which can be economically manufactured and is highly efficient for the intended purpose.

Having thus described my invention, I claim:

In a liner for a flowerpot, a body comprising an elongated backing strip made of paper which readily disintegrates in water, a corrugated paper strip on said backing strip with the crests of the corrugated strip secured to the backing strip, a filling of fertilizer in the corrugations of the corrugated strip on the side thereof remote from said filling strip, and a covering strip glued to the crests of the corrugations on the side of the corrugated strip which is remote from the backing strip, the corrugations on the other side of the strip being open throughout their length, the backing strip extending beyond one end of the corrugated strip and the covering strip extending beyond the other end of the corrugated strip, the extended portions of the backing strips being secured to the body to hold the latter assembled, and sealing strips closing the ends of the corrugations.

RAGNAR O. JOHNSON.